United States Patent
Lu et al.

(10) Patent No.: US 9,382,429 B2
(45) Date of Patent: Jul. 5, 2016

(54) PREPARATION METHOD OF CARBON MODIFIED FILLER

(75) Inventors: Xiaohua Lu, Nanjing (CN); Yijun Shi, Nanjing (CN); Ke Zhou, Nanjing (CN); Changsong Wang, Nanjing (CN); Wenjun Yao, Nanjing (CN)

(73) Assignees: NANJING TAIWEI TECHNOLOGY CO., LTD., Nanjing (CN); NANJING UNIVERSITY OF TECHNOLOGY, Nanjing (CN)

( * ) Notice: Subject to any disclaimer, the term of this patent is extended or adjusted under 35 U.S.C. 154(b) by 737 days.

(21) Appl. No.: 13/817,445

(22) PCT Filed: Aug. 17, 2010

(86) PCT No.: PCT/CN2010/076059
§ 371 (c)(1),
(2), (4) Date: May 5, 2013

(87) PCT Pub. No.: WO2012/022025
PCT Pub. Date: Feb. 23, 2012

(65) Prior Publication Data
US 2013/0221266 A1    Aug. 29, 2013

(51) Int. Cl.
| | | |
|---|---|---|
| C09K 5/14 | (2006.01) |
| C09C 1/44 | (2006.01) |
| C09C 1/36 | (2006.01) |
| C09C 1/40 | (2006.01) |
| C09C 3/06 | (2006.01) |
| C09C 1/02 | (2006.01) |
| C09C 1/04 | (2006.01) |
| C09C 1/14 | (2006.01) |
| C09C 1/24 | (2006.01) |
| C09C 1/28 | (2006.01) |
| C09C 1/30 | (2006.01) |
| C09C 1/34 | (2006.01) |
| F16D 69/02 | (2006.01) |
| C03C 25/44 | (2006.01) |
| C04B 35/628 | (2006.01) |

(52) U.S. Cl.
CPC . *C09C 1/44* (2013.01); *C03C 25/44* (2013.01); *C04B 35/62839* (2013.01); *C09C 1/027* (2013.01); *C09C 1/028* (2013.01); *C09C 1/043* (2013.01); *C09C 1/14* (2013.01); *C09C 1/24* (2013.01); *C09C 1/28* (2013.01); *C09C 1/3054* (2013.01); *C09C 1/346* (2013.01); *C09C 1/3661* (2013.01); *C09C 1/405* (2013.01); *C09C 1/407* (2013.01); *C09C 3/063* (2013.01); *C09K 5/14* (2013.01); *F16D 69/025* (2013.01); *F16D 69/026* (2013.01); *C04B 2235/3232* (2013.01); *C04B 2235/3454* (2013.01)

(58) Field of Classification Search
CPC .......................................................... C09C 1/44
USPC .......................................................... 523/155
See application file for complete search history.

(56) References Cited

U.S. PATENT DOCUMENTS

| | | | | |
|---|---|---|---|---|
| 3,949,106 A | * | 4/1976 | Araki | ...................... C01B 31/00 264/29.6 |
| 6,451,872 B1 | * | 9/2002 | Yamane | ................ B29C 43/006 260/998.13 |

* cited by examiner

*Primary Examiner* — Doris Lee
(74) *Attorney, Agent, or Firm* — Oliff PLC

(57) ABSTRACT

A preparation method of carbon modified filler is provided. The method is: putting the fillers into the reaction zone of a reactor, starting the first heating-up to 400-500° C. under the protective atmosphere at first, then introducing hydrogen after the heating-up; starting the second heating-up to 600-1200° C. after introducing hydrogen and simultaneously introducing the mixture of hydrogen and carbon source gas, keeping at the terminal temperature for 0.1-5 hours, introducing nitrogen and stopping heating after the reaction, cooling, and then getting the carbon modified filler. The above method can obtain a friction material with good mechanical properties, excellent friction and wear performances, stable friction coefficient at high temperature, good braking force and no heat recession.

11 Claims, No Drawings

PREPARATION METHOD OF CARBON MODIFIED FILLER

TECHNICAL FIELD

The present invention belongs to the field of friction materials, and particularly relates to a preparation method of carbon modified filler and its use in the friction materials.

BACKGROUND ART

With the development of society and science technology, the automobile as an indispensable social transport plays a more and more important role in people's work and life. Currently, high-load, high-speed and environmental protection have become the development direction of the automotive industry. However, the technical problems brought by high-load and high-speed of the automobile have not been solved yet, and one of the difficult problems is the automotive brake problem.

The automotive brake is virtually the process in which kinetic energy of the moving automobile is converted to heat energy. The main problem of the brake pad in high-speed and high-load conditions is the failure of the material at high temperatures. People have tried to modify phenolic resin which is used as a binder in the brake pad to improve the heat resistance of phenolic resin, in order to solve the failure problem of the material at high temperature. For example, JP11286676 (A) discloses a method of applying aromatic compounds modified phenolic resin in brake pads. JP10007815 (A) discloses a method of applying a mixed system of rubber modified phenolic resin and ordinary phenolic resin in brake pads. JP2001247640 (A) discloses a method of applying bismaleimide modified phenolic resin in brake pads. Although the performance of the friction materials obtained by the three methods has been improved to some extent, the problem of the failure of materials at high temperature has not been fundamentally resolved.

Taking effective manner to promptly conduct out the heat generated by braking becomes the key to avoid the failure of the brake pad materials at high temperature. When braking, the braking system is expected to provide friction force as great as possible, so that the automobile can be braked in the shortest distance within the shortest time. However, on the other hand, if the friction force is too large when braking, it is very easy to cause lock phenomenon. The greater the friction force is, the faster the rate of heat energy generates, the more serious the heat energy accumulates on the friction surface when braking, and the more easily the material fails.

Currently, many high-end cars use the ABS (anti-lock braking system), ABS can achieve "inching braking" in a high frequency, which can effectively prevent the lock phenomenon due to the high coefficient of friction. On the other hand, the frictional heat can be quickly dispersed in the intervals of inching braking, so that the brake pad materials can be better protected from failure at high temperature. In order to meet the effect of ABS inching braking on the protection materials, a kind of brake pad with high thermal conductivity is required, so as to disperse the heat of the surface of the brake pads in the intervals of inching braking.

Carbon has many advantages such as excellent heat resistance, high thermal conductivity and chemical inertness, which serves as an important structural material and functional material, and is widely used in metallurgy, chemical industry, machinery, electronics, aviation and other fields. Applying the carbon materials in the friction materials can significantly increase the thermal conductivity of the friction materials, so that the brake heat can be conducted out to avoid the failure of materials due to local heat accumulation of the friction surface, moreover, the carbon materials can play an enhanced role. JP2008223781 (A) discloses a method of adding carbon nanofibers into friction materials. EP1357310 (A) discloses a friction material composite containing coated reinforcing fibers comprising carbon and whose matrix comprises silicon carbide. The friction material has high thermal conductivity and good frictional properties at high temperatures. CN98105056.5 discloses a semi-metallic non-asbestos brake pad adding carbon fiber, and the inventive product has high thermal conductivity, smooth braking, wear-resistant and high service life. EP1028098 (A) discloses a friction material prepared by carbon fiber reinforced carbon/carbon composite material suitable for high-speed and high-load. KR100878945 (B1) disclosed a method of coating carbon nanotubes on the surface of the finished brake pads. The brake pads prepared by the method have good thermal conducting property, uniform temperature distribution on the braking surface, high adhesion and good material stability. Although the above methods of adding carbon materials to the friction materials can improve the thermal conductivity of friction material and significantly improve the friction and wear properties of the material, the production costs of the carbon material are very high, which limits its practice use.

SUMMARY OF THE INVENTION

The object of the present invention is to provide a preparation method of carbon modified filler and its use in the friction materials on the basis of the prior art. The friction material containing such carbon modified filler has a high thermal conductivity, good thermal recession, seismic stability and mechanical strength, and can well solve the problem of failure of the conventional brake pad materials at high temperature.

Another object of the present invention is to provide use of the above method in the friction materials.

The purpose of the present invention can be achieved through the following measures:

A preparation method of carbon modified filler, comprising the followings: putting the fillers into the reaction zone of a reactor, starting the first heating-up to 400-500° C. under the protective atmosphere at first, then introducing hydrogen after the heating-up; starting the second heating-up to 600-1200° C. after introducing hydrogen and simultaneously introducing the mixture of hydrogen and carbon source gas, keeping at the terminal temperature for 0.1-5 hours, introducing nitrogen and stopping heating after the reaction, cooling, then getting the carbon modified filler; in the above method, the gas is introduced from the lower part of the reaction zone of the reactor to make the fillers in the reactor in a fluidized state; wherein the filler is selected from one or more of the mineral materials, metal oxide, antimony sulfide, silicon carbide, silicon nitride, silicon dioxide, silicates and metallic elementary substances.

The filler is preferably selected from one or more of zirconium oxide, lead oxide, alumina, iron oxide red, iron oxide black, iron oxide yellow, chrome green, chrome yellow, titanium oxide, copper oxide, zinc oxide, magnesium oxide, tin oxide, titanium-based whiskers, silicon dioxide, silicon carbide, silicon nitride, zirconium silicate, aluminum silicate, barium sulfate, ceramic fibers, glass fibers, mineral fibers, boron fibers, composite mineral fibers, sepiolite fibers, expanded vermiculite, antimony sulfide, zircon powder, emery, calcium carbonate, potassium titanate, sodium titanate, mica powder, copper powder, copper fibers, iron powder, steel fibers, brown corundum, barite, calcite, limestone, argil, diatomaceous earth, talc, chromite, rutile, dolomite, gypsum, magnesite, bauxite, quartz powder, corundum, fluorite, zeolite, cryolite, kaolin, rock wool, quartzite, feldspar, wollastonite, garnet, attapulgite, ceramic hollow spheres, boron silicate compounds and magnesium aluminum silicate compounds. The filler according to the present invention is further preferably selected from one or more of zirconium oxide, alumina, iron oxide red, iron oxide black, titanium oxide, silicon dioxide, magnesium oxide, zinc oxide, zircon, barite, wollastonite, potassium titanate whiskers, mica powder, copper and iron. The morphology of the filler can be provided for various forms, such as particulates, powders, granules, whiskers, etc.

The rate of the first heating-up is 10-30° $C. \cdot min^{-1}$, preferably 15° $C. \cdot min^{-1}$. The terminal temperature of the first heating-up is preferably 500° C.

The rate of including hydrogen after the first heating-up is 300-400 $mL \cdot min^{-1}$, preferably 300 $mL \cdot min^{-1}$. The hydrogen is introduced into a reactor without other gas, followed by stopping including hydrogen and starting the second heating-up simultaneously introducing the mixture gas.

The rate of the second heating-up is 10-30° $C. \cdot min^{-1}$, preferably 25° $C. \cdot min^{-1}$. The terminal temperature of the second heating-up is preferably 1000° C. After reaching the terminal temperature of the second heating-up, the reaction may be conducted for another 0.1-5 hours at the same temperature, preferably 1-5 hours, such as when the terminal temperature of the second heating-up is 1000° C., the reaction is conducted preferably for 2 hours at the same temperature.

During the second heating-up process, the volume ratio of the introduced hydrogen and the introduced carbon source gas is 1-3:4, preferably 1:2.

The carbon source gas can be hydrocarbon, carbon monoxide or carbon dioxide, wherein the hydrocarbon refers to small molecular hydrocarbon, such as methane, ethane, propane, benzene, toluene, etc. The protective atmosphere in the present invention refers to helium, neon, argon or nitrogen, etc.

The surface of carbon modified filler prepared by the present method is covered with a carbon layer having a thickness of 1 nm to 1000 nm, the microscopic structure of the filler is the fibrous structure covering the surface of the filler or the crosslinked network structure wrapping the filler, and the coverage rate of the carbon layer on the surface of the filler is more than 80%. The carbon modified filler prepared by the present method has an average thermal conductivity of 0.2 to 100 times more than that of the unmodified filler.

The present invention also provides a friction material, containing at least one of the above carbon modified filler. A binder may be used in the preparation of the friction material, and the binder may be phenolic resin or modified phenolic resin or rubber or a combination thereof. The fixed speed friction coefficient of the friction material is increased by 1% to 10% at a temperature more than 250° C., the wear rate is decreased by 10% to 70% and the thermal conductivity is increased by 0.3 to 4 times, compared with a friction material without the carbon modified filler.

A method for preparing the above friction material, comprising the following steps:

1) taking a binder and filling materials containing at least one carbon modified filler prepared according to the present application, mixing and stiffing for 4-6 minutes, then adding the mixture into a hot pressing mould;

2) increasing the temperature to 155-185° C. with a pressure of 10-30 MPa, keeping the same temperature and pressure for 5-10 minutes for hot pressing; and 3) after the hot pressing, keeping the temperature of the sample at 185-200° C. for 4-6 hours, then cooling to obtain the friction material.

In step 1), the amount ratio of the binder and the filling materials is decided on the performance of the required friction material and the performance of each filling material. In step 3), the keeping temperature process may be carried out in a sintering furnace and the cooling may be conducted in a natural cooling manner.

The filling materials described herein, except the carbon modified filler, refer to various inorganic or organic fillers required in the production of friction materials in the prior art, such as reinforced fibers and frictional function regulator.

The reinforced fiber may generally be one or more of glass fibers, ceramic fibers, composite mineral fibers, silicate fibers, lignin fibers, cellulose fibers and aramid. The frictional function regulator and other materials are one of iron oxide black, zircon, iron oxide red, zirconium oxide, magnesium oxide, mica powder, fluorite powder, zeolite, vermiculite, anatase, attapulgite, kaolin, lithopone, barium sulfate, friction powder and heavy calcium carbonate, or the combination thereof.

The thermal conductivity of the finished product of the friction material containing the carbon modified filler according to the present invention is 1.2 to 10 times of that of a friction material without the carbon modified filler, regarding the friction coefficient and wear rate, the former also has excellent properties.

The beneficial effects of the present invention include at least one of the following:

1. Compared with the brake pads without the carbon modified filler, the temperature of the friction surface of the brake pads with the carbon modified inorganic filler deceases in the case of achieving the same braking effect, which leads to the highest speed of the vehicle increase appropriately when the load and the required braking distance of the vehicle are respectively the same. When the speed and the required braking distance of the vehicle are respectively the same, the vehicle with carbon modified filler can withstand larger load. When the load and the speed of the vehicle are respectively the same, the brake distance of the brake pads with carbon modified filler will not less than that of the brake pads without the carbon modified filler.

2. After adding the carbon modified inorganic filler in the brake pads, the thermal conducting property of the brake pad materials are significantly improved, so that the frictional heat is distributed more uniform on the material surface, and the material performance will not be affected due to the local accumulation of heat caused by the poor thermal conducting property.

3. After adding the carbon modified inorganic filler in the brake pads, the thermal conducting property of the materials are significantly improved, together with the ABS of the existing high-end cars, the heat of the friction surface can be conducted out more effectively, resulting in decreasing the temperature of the friction surfaces, protecting the brake pad materials, improving the braking effect and extending the lifetime of the materials.

4. After adding the carbon modified inorganic filler in the brake pads, the coefficient of friction is improved, which can increase the braking force, make the coefficient of friction more stable, reduce the wear extent and extend the life of the materials.

It is because of adding the carbon modified inorganic filler in the brake pads, the performance of the material is superior to that of similar products, for example, the coefficient of friction is more stable, the wear rate is smaller, the life of the material is longer, the thermal conducting property is better, and the braking distance is shorter. The materials will not fail when wording at high temperature.

and the coverage rate of the carbon layer on the surface is more than 85%.

The binder and the fillers are weighed according to the mass ratio of each filling material in Table 1, mixed for 5 minutes with stiffing, and add to the hot pressing mould.

The hot pressing process is: heating up to 165° C. with a pressure of 20 MPa, and keeping the temperature and pressure for 8 minutes.

The post-treatment process is: after the hot pressing, putting the sample into the sintering furnace under a temperature of 200° C., keeping the temperature for 5 hours, then cooling naturally to obtain the friction material products.

TABLE 1

| | Mass ratio of the friction materials | | | | | | | |
|---|---|---|---|---|---|---|---|---|
| | Phenolic resin | Aramid | Glass fiber | Ceramic fiber | Magnesium oxide | Barium sulfate | Calcium carbonate | Others |
| Formulation 1 (wt %) | 8 | 5 | 10 (modified) | 15 | 5 | 20 | 15 | 22 |
| Formulation 2 (wt %) | 8 | 5 | 10 (unmodified) | 15 | 5 | 20 | 15 | 22 |

In Table 1, "others" refer to: 11% of antimony sulfide, 3% of friction powder, 5% of the NBR (nitrile rubber buna) and 3% of graphite. "Others" in Table 2 is the same as that in Table 1.

EMBODIMENTS OF THE INVENTION

The technical solutions of the present invention will be specifically illustrated by the following examples. Experiments are carried out according to the Chinese GB5763-1998 national standard to verify the effect of the present invention, as compared with similar products in the market. The examples are as follows:

Example 1

Preparation of carbon modified glass fiber, the method is:

The glass fibers to be modified are put into a reaction furnace, and the gas is introduced from the lower part of the reaction zone of the reactor, so as to make the filling materials in the reactor in a fluidized state. The first heating-up is started at a heating rate of 30° C.·min$^{-1}$ under nitrogen atmosphere in the reactor at first, followed by stopping heating when the temperature is increased to 450° C. and introducing hydrogen at a rate of 300 mL·min$^{-1}$; then the second heating-up after introducing hydrogen is started and simultaneously the mixture of hydrogen and carbon monoxide is introduced in a volume ratio of 1:2. The terminal temperature of the reaction is 800° C., after reacting at this temperature for 2 h, nitrogen is introduced to replace the mixture gas, followed by stopping heating, cooling naturally, and unloading the filling materials to obtain carbon modified glass fibers. The thermal conductivity of the unmodified glass fibers at room temperature is 1.46 W/(m.K), while that of the modified glass fibers is 47.87 W/(m.K). Microscopic detection shows the average thickness of the carbon layer on the surface of the fillers is 80-100 nm, Example 2

The iron oxide black to be modified are put into a reaction furnace, and the gas is introduced from the lower part of the reaction zone of the reactor, so as to make the filling materials in the reactor in a fluidized state. The first heating-up is started at a heating rate of 30° C.·min$^{-1}$ under helium atmosphere in the reactor at first, followed by stopping heating when the temperature is increased to 470° C. and introducing hydrogen at a rate of 330 mL·min$^{-1}$, then the second heating-up after introducing hydrogen is started and simultaneously the mixture of hydrogen and toluene is introduced in a volume ratio of 1:2. The terminal temperature of the reaction is 850° C., after reacting at this temperature for 3 h, nitrogen is introduced to substitute for the mixture gas, followed by stopping heating, cooling naturally, and unloading the filling materials to obtain carbon modified iron oxide black. The thermal conductivity of the unmodified iron oxide black at room temperature is 6.88 W/(m.K), while that of the modified iron oxide black is 23.4 W/(m.K). Microscopic detection shows the average thickness of the carbon layer on the surface of the fillers is 100-150 nm, and the coverage rate of the carbon layer on the surface is more than 85%.

The binder and the fillers are weighed according to the mass ratio of each filling material in Table 2, mixed and stirred for 5 minutes, and added to the hot pressing mould.

The hot pressing process is: heating up to 165° C. with a pressure of 20 MPa, and keeping the temperature and pressure for 8 minutes.

The post-treatment process is: after the hot pressing, putting the sample into the sintering furnace under a temperature of 200° C., keeping the temperature for 5 hours, then cooling naturally to obtain the friction material products.

TABLE 2

| | Mass ratio of the friction materials | | | | | | | | |
|---|---|---|---|---|---|---|---|---|---|
| | Phenolic resin | Aramid | Glass fiber | Ceramic fiber | Magnesium oxide | Barium sulfate | Calcium carbonate | Iron oxide black | Others |
| Formulation 3 (wt %) | 8 | 5 | 10 | 15 | 5 | 20 | 15 | 3 (modified) | 22 |
| Formulation 4 (wt %) | 8 | 5 | 10 | 15 | 5 | 20 | 15 | 3 (unmodified) | 22 |

The brake pads are prepared by using the friction materials according to the formulations in Table 1 and Table 2 and tested for its performance. The results are as follows:

TABLE 3

| | Thermal conductivity of the brake pads | | | |
|---|---|---|---|---|
| | Formulation 1 | Formulation 2 | Formulation 3 | Formulation 4 |
| Thermal conductivity | 1.4 W/(m·K) | 0.7 W/(m·K) | 1.05 W/(m·K) | 0.75 W/(m·K) |

TABLE 4

| | Experimental data of the brake pads in each example | | | | | | | |
|---|---|---|---|---|---|---|---|---|
| | Coefficient of friction | | | | | | | |
| | Example 1 | | | | Example 2 | | | |
| | Formulation 1 | | Formulation 2 | | Formulation 3 | | Formulation 4 | |
| Temperature/°C. | Increasing temperature | Decreasing temperature | Increasing temperature | Decreasing temperature | Increasing temperature | Decreasing temperature | Increasing temperature | Decreasing temperature |
| 100 | 0.42 | 0.41 | 0.42 | 0.4 | 0.41 | 0.4 | 0.4 | 0.4 |
| 150 | 0.44 | 0.42 | 0.43 | 0.42 | 0.42 | 0.42 | 0.42 | 0.41 |
| 200 | 0.45 | 0.44 | 0.44 | 0.41 | 0.44 | 0.43 | 0.43 | 0.42 |
| 250 | 0.44 | 0.43 | 0.43 | 0.4 | 0.43 | 0.42 | 0.42 | 0.41 |
| 300 | 0.43 | 0.42 | 0.42 | 0.39 | 0.42 | 0.41 | 0.4 | 0.39 |
| 350 | 0.42 | | | 0.37 | 0.4 | | | 0.36 |

TABLE 5

| | Experimental data of the brake pads in each example | | | |
|---|---|---|---|---|
| | Wear rate | | | |
| | Example 1 | | Example 2 | |
| Temperature/°C. | Formulation 1 | Formulation 2 | Formulation 3 | Formulation 4 |
| 100 | 0.03 | 0.05 | 0.031 | 0.064 |
| 150 | 0.045 | 0.064 | 0.049 | 0.085 |
| 200 | 0.068 | 0.103 | 0.075 | 0.136 |
| 250 | 0.105 | 0.17 | 0.117 | 0.19 |
| 300 | 0.157 | 0.22 | 0.185 | 0.25 |
| 350 | 0.223 | 0.3 | 0.246 | 0.338 |

It can be seen from Table 3 that, compared with the materials with addition of unmodified glass fibers, the thermal conductivity of the materials with addition of carbon modified glass fibers in Example 1 is significantly improved by about two times. It can be seen from Table 4 that, the coefficient of friction of the materials with addition of carbon modified glass fibers is increased by 0.01-0.02, and the effect is more obvious. It can be seen from the comparison of wear rate in Table 5 that, the carbon modified glass fibers have an significant effect on the decline of the wear rate of the materials. The thermal conducting property of the materials with addition of carbon modified iron oxide black in Example 2 is also improved. It can be concluded from the experimental data of friction in Table 4 and Table 5 that, the coefficient of friction of the materials with addition of carbon modified iron oxide black is improved regardless of high or low temperatures, the materials are not easy to exhibit thermal recession at high temperature, and the wear rate of the materials is significantly lower than that of the friction materials with addition of unmodified iron oxide black.

Herein, the friction materials prepared from the carbon modified fiber glass of example 1 is compared with the imported similar products in the market:

TABLE 6

| Comparison of the experimental data with similar products in the market | | | | | |
|---|---|---|---|---|---|
| | Honda Accord | BMW M6 | Ford Mondeo | Buick Regal | Example 1 |
| Thermal conductivity | 0.8 W/(m·K) | 0.69 W/(m·K) | 0.92 W/(m·K) | 0.83 W/(m·K) | 1.4 W/(m·K) |

TABLE 7

Comparison of the experimental data with similar products in the market

| Temperature/ °C. | Japan's Honda Accord brake pads | | BMW M6 brake pads | | Ford Mondeo brake pads | | Buick Regal brake pads | | Example 1 | |
|---|---|---|---|---|---|---|---|---|---|---|
| | Increasing temperature | Decreasing temperature | Increasing temperature | Decreasing temperature | Increasing temperature | Decreasing temperature | Increasing temperature | Decreasing temperature | Increasing temperature | Decreasing temperature |
| 100 | 0.41 | 0.4 | 0.42 | 0.41 | 0.41 | 0.41 | 0.42 | 0.4 | 0.42 | 0.41 |
| 150 | 0.43 | 0.42 | 0.44 | 0.42 | 0.42 | 0.41 | 0.42 | 0.41 | 0.44 | 0.42 |
| 200 | 0.43 | 0.42 | 0.45 | 0.43 | 0.44 | 0.43 | 0.44 | 0.43 | 0.45 | 0.44 |
| 250 | 0.44 | 0.42 | 0.44 | 0.43 | 0.44 | 0.43 | 0.42 | 0.41 | 0.44 | 0.43 |
| 300 | 0.42 | 0.4 | 0.42 | 0.42 | 0.43 | 0.42 | 0.41 | 0.4 | 0.43 | 0.42 |
| 350 | 0.4 | | 0.4 | | 0.42 | | 0.42 | | 0.42 | |

TABLE 8

Comparison of the experimental data with similar products in the market

Wear rate

| Temperature/ °C. | Honda Accord | BMW M6 | Ford Mondeo | Buick Regal | Example 1 |
|---|---|---|---|---|---|
| 100 | 0.074 | 0.063 | 0.06 | 0.056 | 0.03 |
| 150 | 0.099 | 0.084 | 0.076 | 0.081 | 0.045 |
| 200 | 0.124 | 0.102 | 0.122 | 0.109 | 0.068 |
| 250 | 0.17 | 0.152 | 0.187 | 0.211 | 0.105 |
| 300 | 0.23 | 0.216 | 0.245 | 0.278 | 0.157 |
| 350 | 0.304 | 0.292 | 0.329 | 0.31 | 0.223 |

It can be seen from Table 6 that, compared with imported similar products in the market, the friction material with addition of carbon modified glass fibers has a higher thermal conductivity. It can be seen from Table 7 that, the coefficient of friction of the products according to the present invention shows little change at low and high temperatures, and is very stable. It is easy to see from Table 8 that, the wear rate of the products according to the present invention is significantly less than that of the similar products in the market.

Example 3

The titanium oxide to be modified are put into a reaction furnace, and the gas is introduced from the lower part of the reaction zone of the reactor, so as to make the filling materials in the reactor in a fluidized state. The first heating-up is started at a heating rate of 30° C.·min$^{-1}$ under helium atmosphere in the reactor at first, followed by stopping heating when the temperature is increased to 450° C. and introducing hydrogen at a rate of 320 mL·min$^{-1}$, then the second heating-up after introducing hydrogen is started and simultaneously the mixture of hydrogen and carbon monoxide is introduced in a volume ratio of 1:2. The terminal temperature of the reaction is 850° C., after reacting at this temperature for 3 h, nitrogen is introduced to substitute for the mixture gas, followed by stopping heating, cooling naturally, and unloading the filling materials to obtain carbon modified titanium oxide. The thermal conductivity of the unmodified titanium oxide at room temperature is 6.6 W/(m.K), while that of the modified titanium oxide is 45W/(m.K).

Example 4

The titanium iron whisker to be modified are put into a reaction furnace, and the gas is introduced from the lower part of the reaction zone of the reactor, so as to make the filling materials in the reactor in a fluidized state. Start the first heating-up at a heating rate of 30° C.·min$^{-1}$ under helium atmosphere in the reactor at first, stop heating when the temperature is increased to 450° C. and introducing hydrogen at a rate of 360 mL·min$^{-1}$, then starting the second heating-up after introducing hydrogen and simultaneously introducing the mixture of hydrogen and carbon monoxide in a volume ratio of 1:2. The terminal temperature of the reaction is 850° C., after reacting at this temperature for 3 h, nitrogen is introduced to substitute for the mixture gas, followed by stopping heating, cooling naturally, and unloading the filling materials to obtain carbon modified titanium iron whisker. The thermal conductivity of the unmodified titanium iron whisker at room temperature is 0.054 W/(m.K), while that of the modified titanium iron whisker is 2.1 W/(m.K).

Example 5

The wollastonite to be modified are put into a reaction furnace, and the gas is introduced from the lower part of the reaction zone of the reactor, so as to make the filling materials in the reactor in a fluidized state. The first heating-up is started at a heating rate of 30° C.·min$^{-1}$ under helium atmosphere in the reactor at first, followed by stopping heating when the temperature is increased to 450° C. and introducing hydrogen at a rate of 300 mL·min$^{-1}$; then the second heating-up after introducing hydrogen is started and simultaneously the mixture of hydrogen and ethyne is introduced in a volume ratio of 1:2. The terminal temperature of the reaction is 850° C., after reacting at this temperature for 3 h, nitrogen is introduced to substitute for the mixture gas, followed by stopping heating, cooling naturally, and unloading the filling materials to obtain carbon modified wollastonite. The thermal conductivity of the unmodified wollastonite at room temperature is 0.056 W/(m.K), while that of the modified wollastonite is 0.987 W/(m.K).

What is claimed is:

1. A method for producing a carbonized filler, said method comprising the following steps: putting a filler in the reaction zone of a reactor, heating and setting the temperature ranging from 400 to 500° C. under the protective atmosphere, adding hydrogen at first stage; at second stage, heating and setting the temperature ranging from 600 to 1200° C. and simultaneously adding a mixture of hydrogen and carbon source gas, then maintaining the final temperature for 0.1 to 5 hours; then adding nitrogen and removing heating source, cooling, and the carbonized filler being resulted; wherein maintaining said filler in fluidized state by adding the gas through the lower part of the reaction zone of the reactor during reaction process; wherein said filler is one or more of materials selected from a group consisting of mineral material, metal oxide, antimony sulfide, silicon carbide, silicon nitride, silicon dioxide, carbonates, titanate, silicate and metallic elementary substance.

2. The method for producing a carbonized filler according to claim 1, wherein the filler is one or more of materials selected from a group consisting of zirconium oxide, lead oxide, alumina, iron oxide red, iron oxide black, iron oxide yellow, chrome green, chrome yellow, titanium oxide, copper oxide, zinc oxide, magnesium oxide, tin oxide, titanium-based whiskers, silicon dioxide, calcium carbonate, potassium titanate, sodium titanate, silicon carbide, silicon nitride, zirconium silicate, antimony sulfide, aluminum silicate, barium sulfate, copper powder, copper fiber, iron powder, steel fibers, ceramic fibers, glass fibers, mineral fibers, boron fibers, composite mineral fibers, expanded vermiculite, zircon, emery, mica powder, sepiolite fibers, brown corundum, barite, calcite, limestone, argil, diatomaceous earth, talc, chromite, rutile, dolomite, gypsum, magnesite, bauxite, quartz powder, corundum, fluorite, zeolite, cryolite, kaolin, rock wool, quartzite, feldspar, wollastonite, garnet, attapulgite, ceramic hollow spheres, boron silicate compound and magnesium aluminum silicate compound.

3. The method for producing a carbonized filler according to claim 1, wherein the rate for heating is 10-30° C.·min$^{-1}$, the final temperature is 500° C., and the rate for adding hydrogen is 300-400 mL·min$^{-1}$ at the first stage.

4. The method for producing a carbonized filler according to claim 1, wherein the rate for heating is 10-30° C.·min$^{-1}$, and the final temperature is 1000° C. at the second stage.

5. The method for producing a carbonized filler according to claim 1, wherein the surface of the carbonized filler is covered with a carbon layer having a thickness of 1 nm to 1000 nm, and the coverage rate of the carbon layer on the surface of the filler is more than 80%.

6. The method for producing a carbonized filler according to claim 1, wherein the average thermal conductivity of the carbonized filler is 0.2 to 100 times more than that of the unmodified filler.

7. The method for producing a carbonized filler according to claim 1, wherein the volume ratio of hydrogen and carbon source gas is 1-3:4 at the second stage.

8. The method for producing a carbonized filler according to claim 1 or 7, wherein the carbon source gas is selected from a group consisting of hydrocarbon, carbon monoxide or carbon dioxide.

9. A friction material comprising at least one of the carbonized fillers produced by the method of claim 1.

10. The friction material according to claim 9, wherein the fixed speed friction coefficient of the friction material is increased by 1% to 10% at a temperature more than 250° C., the wear rate is decreased by 10% to 70% and the thermal conductivity is increased by 0.3 to 4 times, compared with that of a friction material without carbonized filler.

11. A method for manufacturing the friction material of claim 9, said method comprising the following steps:
1) mixing a binder and filling materials containing at least one of carbonized filler produced by the method of claim 1 for 4-6 minutes, and then adding the mixture into a hot pressing mold;
2) setting a temperature ranging from 155 to 185° C., pressing the mixture for 5-10 minutes under a pressure of 10-30 MPa; and
3) maintaining the temperature of the mixture ranging from 185 to 200° C. for 4-6 hours after the pressing of step 2), then cooling the mixture and resulting the friction material.

* * * * *